Aug. 11, 1925.
C. T. ALLCUTT
1,549,704
BATTERY CHARGING SYSTEM
Filed Dec. 17, 1919
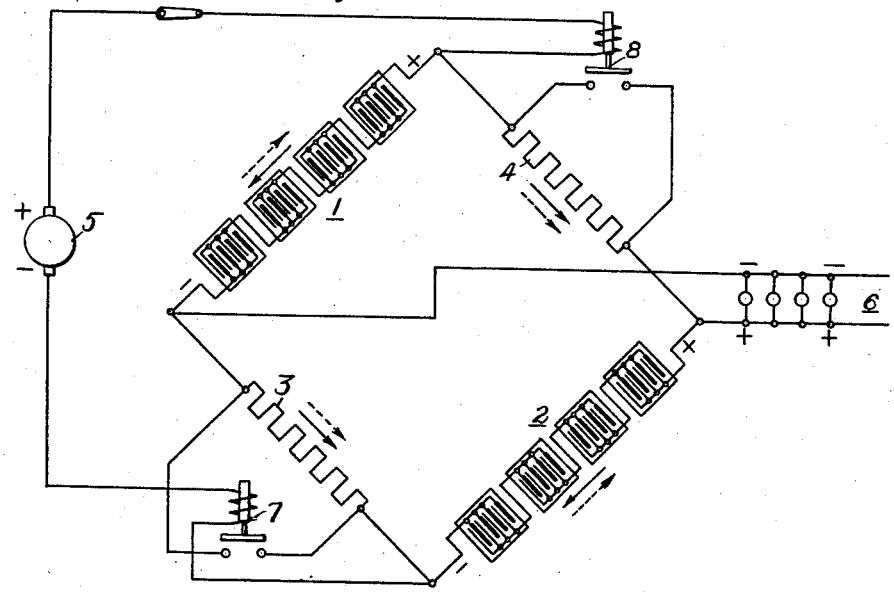
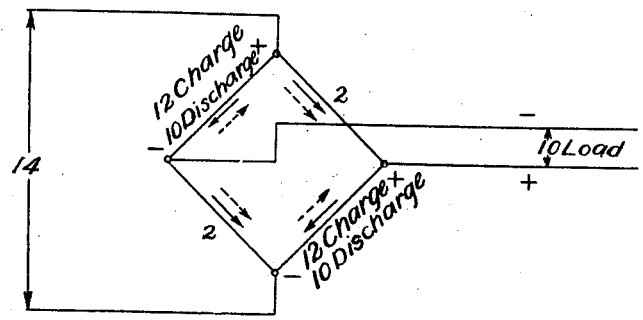
WITNESSES:
J. A. Helsel.
A. A. Brand
INVENTOR
Chester T. Allcutt
BY
Wesley G. Carr
ATTORNEY Patented Aug. 11, 1925.

1,549,704

UNITED STATES PATENT OFFICE.

CHESTER T. ALLCUTT, OF PITTSBURGH, PENNSYLVANIA, ASSIGNOR TO WESTINGHOUSE ELECTRIC & MANUFACTURING COMPANY, A CORPORATION OF PENNSYLVANIA.

BATTERY-CHARGING SYSTEM.

Application filed December 17, 1919. Serial No. 345,484.

*To all whom it may concern:*

Be it known that I, CHESTER T. ALLCUTT, a citizen of the United States, and a resident of Pittsburgh, in the county of Allegheny and State of Pennsylvania, have invented a new and useful Improvement in Battery-Charging Systems, of which the following is a specification.

My invention relates to battery-charging systems and it has particular relation to systems of the character described wherein the charging rate is relatively high, as compared with the load current derived therefrom.

In the accompanying drawing, Figure 1 is a diagrammatic illustration of circuits and apparatus embodying my invention, and Fig. 2 is a schematic representation of the voltage values existing in the different portions of the system shown in Fig. 1.

It is well known that the charging voltage of a storage-battery system is always higher than the voltage of a load which may be derived therefrom, on account of the internal-resistance drop of the cells comprising the storage-battery aggregate. The common method of eliminating the wide difference between the charging and the discharging voltages is by providing extra cells, known as end cells, which are connected in series with the charging source and which are eliminated at the initiation of the load derivation, being gradually restored to series relationship with the other cells as the voltage of the battery aggregate is lowered on account of the current discharge. This method, however, necessitates the use of somewhat elaborate switching and control means, whereby the load may be properly energized.

One object of my invention is to provide a storage-battery aggregate wherein the terminal voltage of the load circuit will be unaffected by the charging current or, in other words, wherein the load voltage will be substantially constant and of a value approximately equal to the lower voltage limit of the cells used. In order to accomplish the above object, I arrange the storage cells in groups and associate therewith impedance devices having an impedance equal to the internal resistance of the groups to which they are connected and I then insert or eliminate these impedance devices as required by the operating conditions.

My invention is particularly adapted for use with systems wherein a relatively high charging rate is desired, as compared with a low discharge rate.

Referring now more particularly to the drawing, two equal groups of storage batteries, 1 and 2, are arranged on opposite sides of a closed square or bridge, the other opposite sides of the square being formed by impedance devices 3 and 4, and it will be understood that the values of the latter are equal to the internal resistances of the groups with which they are connected in series relationship across a charging source 5, connected to diagonally opposite corners of the square or bridge.

A load circuit 6 is derived from the storage-battery aggregate, being connected to the remaining corners of the square or bridge and the polarities of the battery groups of the source of charging current and of the load circuit are indicated by plus and minus symbols. The impedance devices, 3 and 4, are arranged to be short-circuited through the instrumentality of switches 7 and 8, respectively, which are held in open position as long as the charging current is supplied from the source 5.

Referring now to Fig. 2, the operation of a storage-battery system, arranged as shown in Fig. 1, will be considered. I have indicated the load voltage as equal to 10 volts, the discharge voltage of each of the battery groups as 10 volts, the charging voltage of the latter as 12 volts, and the voltage of the charging device as 14 volts. The internal-resistance drop across each battery group is equal to 2 volts, and, therefore, the voltage drop across the impedance devices is likewise made equal to 2 volts. Therefore, the entire charging voltage must be 14 volts, as heretofore indicated. It will be noted that the voltage drop through the cell groups, when discharging, is opposite in direction to the drop therethrough when charging but that the voltage drops through the impedance devices are constant in direction, as indicated by the arrows, the full-line arrows indicating the voltage drops upon charge and the broken-line arrows illustrating the direction of drop on discharge.

If it is desired to charge and discharge simultaneously, the voltage across the load is maintained constant at 10 volts by reason of the opposing-voltage drops in the battery group 1 and impedance device 4, and the battery group 2 and in the impedance device 3, respectively; it being noted that the load circuit is derived from the lower-potential points of the square while the source of charging current is connected to the higher-potential points of the square.

As hereinbefore indicated, however, the main advantage of a system constructed in accordance with my invention is realized when the charging rate is quite high, as compared with the discharge rate, although, if it is desired to discharge only, the switching devices which short circuit the impedance devices may be rendered ineffective when the charging device is disconnected from the battery aggregate.

While I have described but one embodiment of my invention, it is obvious that many modifications therein may occur to those skilled in the art, and I desire, therefore, that it shall be limited only by the prior art or by the scope of the appended claims.

I claim as my invention:

1. In a system for the storage of electrical energy, a plurality of energy-storing and restoring units, a source of charging current therefor, a load circuit derived therefrom, and means having an impedance equivalent to the internal impedance of the units connected thereto for maintaining the terminal voltage of the load circuit substantially constant.

2. In a storage-battery system, a plurality of energy-storing and restoring units disposed in groups, a source of charging current therefor, a load circuit derived therefrom, and means connected in series with said groups of units and having an impedance equal to the internal impedance of the associated group, whereby the terminal voltage of the load circuit is unaffected by the charging current.

3. In a system for storing electrical energy, a plurality of energy-storing and restoring units disposed in parallel-connected groups, a source of charging current therefor, a load circuit derived therefrom, and means having an impedance equal to the internal impedance of each group connected in series therewith, whereby the terminal voltage of the load circuit is unaffected by the charging current.

4. In a storage-battery system, energy-storing and restoring units disposed in parallel-connected groups, a source of charging current therefor, impedance means equal in value to the internal impedance of the groups of units connected in series therewith, and a load circuit derived from the points between said means and said groups.

5. In a system for storing electrical energy, energy-storing and restoring units disposed in parallel-connected groups, impedance means equal in value to the internal impedance of the groups of units connected in series therewith, a source of charging current for said units connected to the higher-potential points of the aggregate, and a load circuit derived from the lower-potential points between said means and said groups.

6. In a storage-battery system, energy-storing and restoring units and impedance devices arranged in a closed polygon, the units being disposed in groups on opposite sides thereof, the impedance devices having an impedance equal to the internal impedance of each group and disposed on other opposite sides of the polygon, a source of charging current connected to the higher-potential corners of said polygon, and a load circuit derived from the lower-potential corners thereof.

7. In a storage-battery system, energy-storing and restoring units and impedance devices arranged in a closed polygon, the units being disposed in groups on opposite sides thereof, the impedance devices having an impedance equal to the internal impedance of each group and disposed on other opposite sides of the polygon, a source of charging current connected to the higher-potential corners of said polygon, a load circuit derived from the lower-potential corners thereof, and means whereby said impedance devices are rendered ineffective when said source of charging current is disconnected.

8. In a storage-battery system, energy-storing and restoring units and impedance devices arranged in a closed polygon, the units being disposed in groups on opposite sides thereof, the impedance devices having an impedance equal to the internal impedance of each group and disposed on other opposite sides of the polygon, a source of charging current connected to the high-potential corners of said polygon, a load circuit derived from the lower-potential corners thereof, and means governed by the charging current for short-circuiting the impedance devices.

9. In a storage-battery system, a circuit comprising a plurality of energy-storing and restoring units and impedance devices, the units being disposed in separated groups, the impedance devices having an impedance equal to the internal impedance of each group and connected to said units, a source of charging current connected to the higher-potential points of said circuit, and a load circuit derived from the lower potential points thereof.

10. In a storage-battery system a circuit comprising a plurality of energy-storing and restoring units and impedance devices, the units being disposed in separated groups, the impedance devices having an impedance equal to the internal impedance of each group and connected to said units, a source of charging current connected to the higher-potential points of said circuit, a load circuit derived from the lower-potential points thereof, and means whereby said impedance devices are rendered ineffective when said source of charging current is disconnected.

11. In a storage-battery system, a circuit comprising a plurality of energy-storing and restoring units and impedance devices, the units being disposed in separated groups, the impedance devices having an impedance equal to the internal impedance of each group and connected to said units, a source of charging current connected to the high-potential points of said circuit, a load circuit derived from the lower-potential points thereof, and means governed by the charging current for short-circuiting the impedance devices.

In testimony whereof, I have hereunto subscribed my name this 5th day of December 1919.

CHESTER T. ALLCUTT.